United States Patent
Ibezim et al.

(10) Patent No.: US 6,526,138 B1
(45) Date of Patent: Feb. 25, 2003

(54) SYSTEM AND METHOD FOR EDGE SWITCH QUERY USING ADVANCED INTELLIGENT NETWORK PROTOCOL

(75) Inventors: James A. Ibezim, Wayside, NJ (US); Barbara Joanne Kittredge, Westfield, NJ (US); James J. Mansell, Fair Haven, NJ (US); Robert Yaeger Peters, Jr., Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/366,626

(22) Filed: Aug. 3, 1999

Related U.S. Application Data

(60) Provisional application No. 60/114,532, filed on Dec. 31, 1998.

(51) Int. Cl.[7] ................................................ H04M 7/00
(52) U.S. Cl. ............................ 379/221.08; 379/221.09; 379/221.12; 379/224
(58) Field of Search ........................... 379/219, 220.01, 379/221.08, 221.09, 221.12, 224

(56) References Cited

U.S. PATENT DOCUMENTS 5,574,780 A * 11/1996 Andruska et al. ...... 379/207.13
5,915,013 A * 6/1999 Mintz et al. ................. 370/217

OTHER PUBLICATIONS

No. 3 ESS: System Objectives and Organization, By A.E. Ritchie and L.S. Tuomenoksa, American Telephone and Telegraph Company, The Bell System Technical Journal, vol. 56, No. 7, Sep. 1977.

The 5ESS Switching System: Introduction, By K.E. Marsteck and A.E. Spencer, Jr., AT&T Technical Journal, vol. 64, No. 6 Jul.–Aug. 1985.

* cited by examiner

Primary Examiner—Harry S. Hong

(57) ABSTRACT

A system and method for selectively routing telephone calls in an Advanced Intelligent Network, wherein an edge switch 102, comprising an AIN-equipped switching system, sends a query message to a service control point 108 and receives a response message containing call discrimination information about a telephone call, whereby the edge switch 102 determines whether to route the telephone call via a toll tandem office 100 for further processing. The system further includes a segmentation directory 140 which contains information determinative of which service control point 108 has the service logic to process the call.

15 Claims, 2 Drawing Sheets

SYSTEM AND METHOD FOR EDGE SWITCH QUERY USING ADVANCED INTELLIGENT NETWORK PROTOCOL

RELATED APPLICATIONS

The present application claims priority to U.S. provisional Appl'n No. 60/114,532, filed Dec. 31, 1998.

FIELD OF THE INVENTION

This invention relates in general to telephony and in particular to the art of using the Signaling System Number 7 (SS7) protocol to effect a database lookup by a Service Control Point (SCP) to assist in routing a toll call in a telephone network.

BACKGROUND OF THE INVENTION

The conventional telephone network, known as the Public Switched Telephone Network (PSTN), may be thought of as at least two different networks. The first of these networks is called an End Office (EO), and is typically operated by Local Exchange Companies (LEC), and the second-the network that carries toll traffic—is typically operated by an Inter-Exchange Carrier (IXC). These distinctions are used only for illustrative purposes. It may be the case, for example, that the same company serves as both the EO and the IXC. Additionally, the EO could be a wireline telephone company or a wireless telephone company, providing a subscriber loop via networks called Wireless Local Loops.

To complete a call that originates at an EO, a gateway switch functioning as an originating toll station (OTS) or a tandem toll office (TO) is typically accessed. The OTS and the TO are ordinarily controlled by the IXC. Once the gateway switch takes control of the telephone call, the call can be completed without accessing the EO, which originated the call. In such a network, edge switches are used to concentrate customer traffic from EOs and feed it to a carrier network.

Other configurations of network interconnections are also possible. For example, a direct link to a carrier of toll traffic, such as an IXC or other carrier, can be established between a Customer Premise Equipment (CPE) located at a customer site and the gateway switch. In such cases, the IXC traffic that originates at the customer site is concentrated or "aggregated" by the CPE and routed via the toll carrier's trunks. These CPE vehicles that perform such traffic aggregation or gateway function between a customer site and the carrier network are also called edge switches.

An edge switch is a switch located at the edge of a network, typically the EO network or a CPE, where traffic from network nodes such as the EOs or CPEs crosses over to the toll or other carrier networks. The edge switch network configuration can be considered as a network comprising several subtending nodes causing the traffic to converge at a concentrator node. Thus, in a PSTN, the EO or the CPEs form the subtending nodes and the IXC toll tandem switches or other carrier vehicles act as concentrator nodes or gateways to the longdistance trunks. Thus, the subtending nodes or edges may be operated by one entity such as a LEC or a large customer such as a major bank or a government agency, whereas the concentrator or gateway may be operated by an IXC or a toll carrier or other entity. In other configurations, the edge switch vehicles could be operated by the toll carriers and the CPEs or the nodes that feed the traffic to the edge switches could be operated by the so-called nodal customers, such as large banks, or government agencies.

In the following discussion, reference is made to an "edge switch." This reference should be understood to encompass all configurations of switching systems that could serve the purpose of establishing an interconnection between two switching networks, including, but not limited to, an EO switching system or a switching system such as a Private Branch Exchange (PBX) or other switch serving as a CPE. An example of an edge switching system is a class 5 system such as the Lucent® 5ESS™ switching system. The 5ESS™ is described by K. E. Martersteck, et al., in *AT&T Technical Journal*, Volume 64, No. 6, part 2, pp. 1305–1564 (July/August, 1985). Other examples of switching systems that could function as edge switches are the DMS-250™ switching system marketed by Nortel, Inc.; the EWSD™ switching system marketed by Siemens AG of Munich, Germany; the Lucent® DEFINITY™ PABX system; and the NEAX-51E™ switching system marketed by Nippon Electric Corporation of Japan.

Similarly, a reference in the following discussion to a "toll tandem" should be understood as encompassing any toll switching system or other similar vehicle that can determine the routing by either looking up from a traditional database or by interfacing with an intelligent network database such as a Service Control Point (SCP). The toll tandem switch may be, illustratively, an electronic program-controlled telephone switching system of the No. 4ESS™ design as described by A. E. Ritchie, et al., in the *Bell System Technical Journal* (BSTJ), Volume 56, No. 7 (September, 1977). The 4ESS™ switch performs multiple functions: as an originating switch, and as a toll tandem, and as a gateway to the SCP database. When it functions as an originating switch, the 4ESS™ switch is programmed to open a voice connection to a subscriber to play announcements, and receive input as touch-tone™ digits or other forms prior to routing a call on a network trunk. Thus, an originating switch such as a 4ESS™ is capable of engaging in a dialog with a subscriber to obtain additional information (e.g., authorization code for special calls).

A telephony Advanced Intelligent Network (AIN) comprises a network within the PSTN comprising switching systems such as the edge switches and the toll tandem switches, adjunct computer processors and other communicating components equipped with the capability to communicate using an out-of-band signaling method known as Common Channel Signaling (CCS). CCS is a high speed data link configured to carry network control information to and from various elements of the network. The AIN is described in detail in U.S. Pat. No. 5,247,571, which is incorporated herein by reference. For more information on intelligent telephony networks, see *The Intelligent Network Standards: Their Application to Services* (Igor Faynberg, Ed.), McGraw Hill Series on Telecommunications (November 1996).

The details of the usage of CCS to control and manage a telecommunications network are given in U.S. Pat. Nos. 5,515,427 and 4,277,649, both of which are incorporated herein by reference. An example of the CCS signaling method is CCS No. 7 which is also known as Signaling System 7, or SS7. SS7 is the name given to a suite of layered communication protocols that are used to access telephony databases, to establish and maintain telephone calls, and for other purposes. The part of the SS7 signaling protocol that is typically used by an AIN-equipped switching system to access telephony databases to obtain special instructions is called the Transaction Capabilities Application Part (TCAP).

U.S. Pat. No. 5,901,213, by Benhabib, et al., whose contents are also incorporated by reference, describes a virtual dedicated access by telecommunication subscribers to an IXC provided by way of an intelligent local EO that routes calls either to the IXC or to a local EO. The intelligent local EO itself advantageously performs inter-exchange processing of calls, as required, for calls that originate with, or terminate at, a customer rather than automatically route calls to the IXC for such inter-exchange processing, as was previously required.

In general, in an AIN, a switching system is equipped with at least one triggering device implemented as software, circuitry, or a combination of the two. The triggering device is configured to recognize the occurrence of certain types of phone calls ("trigger conditions") and respond accordingly by handling such calls in a special way. Typically, to provide special handling in response to a trigger condition, the switching system suspends normal execution of the phone call, communicates with another network element to obtain special instructions, and handles that phone call according to the special instructions. In contrast, ordinary telephone calls do not require any special handling and therefore do not require special instructions from other network elements. Rather, in processing ordinary calls, local and toll tandem office switches function in a normal way and route such calls according to the traditional telephony methods.

Several types of trigger conditions may be specified in an AIN-equipped switching system. These include Originating Trigger conditions, Mid-Call Trigger conditions and Termination Trigger conditions, depending on whether the special handling of the call is performed based on a triggering event at the time of initiation of a call, during the course of a call, or at the time of termination of a call. An example of an originating trigger condition is an 800-call. This trigger condition is also called a Dialed Number trigger condition (DN trigger). Here, the special handling of the call is triggered by a user dialing the 800-number. In general, such numbers are translated to regular telephone numbers called Plain Old Telephone Service (POTS) numbers before they are routed to proper destination points via the traditional methods. Handling an 800-number call within an AIN network is described in detail in U.S. Pat. No. 5,425,090, which is incorporated herein by reference. Other examples of trigger conditions are the Off-hook Immediate trigger condition (OHI) and the Off-hook Delay trigger condition (OHD).

A switching system that is provisioned with a class of pre-defined trigger conditions and equipped to communicate with the telephone network via CCS is called an AIN-equipped switching system. In the description given herein, the toll tandem office switching system is assumed to be equipped with AIN call triggering capabilities such as those described in the *Bellcore Advanced Intelligent Network (AIN) 0.1 Switching Systems Generic Requirements* (TR-NWT-001284).

A Service Control Point (SCP) is a part of an intelligent telephone network that provides a switching system with certain routing related information stored in a database coupled to it. For example, a SCP may store the Inward Wide-Area Telecommunication Service (INWATS) database, which translates a 10-digit 800-number to a POTS number. An example of an SCP is the 2NCP™ ("network control point") system commercially available from Lucent Technologies, Inc.

The SCP also supports the deployment of a variety of other telephone services such as the Software Defined Network (SDN) service, commonly known as the Virtual Private Network (VPN) service. SDN allows a subscriber who desires services at geographically distant locations to define a private network within the PSTN. The SDN could be viewed as a network within a network, defined entirely by software. Each subscriber is given a 7-digit telephone network, which is translated to a 10-digit POTS number by the SCP. In an intelligent telephone network, the SDN service is capable of offering a variety of customized intelligent call processing services tailored to a calling party or a calling station.

For the purposes of describing this invention, two types of telephone calls are assumed. A telephone call of the first kind is defined as one that requires additional information from a toll subscriber. Though the subscriber may be physically connected to a nodal switch such as a PBX functioning as a CPE that is in turn connected to an edge switching system as the entry point to the toll carrier's network, for toll calls he or she is assumed to be a subscriber of the toll carrier. Suppose the toll subscriber makes a telephone call. This call could be a local call or it could be a toll call. This discrimination can be made by performing a lookup in a database such as the 2NCP™ database. When it is determined that the toll subscriber made a toll call that requires additional information—such as an authorization code or a credit card number—which can be obtained in the form of an interactive dialog, the toll call is further processed by establishing a voice path between a suitably equipped and programmed toll tandem office and the subscriber. At the same time, control of the call is transferred to the toll tandem office to handle the call from that point.

All other calls are termed as calls of the second kind. For example, a simple number translation without the need for additional user input, such as an 800-number call, is defined as a call of the second kind. Once this is determined, the edge switch can perform the appropriate routing decision without any further information from the subscriber. Some other calls that arrive at an edge switch may be local to the network served by that switch, with no need to access the toll tandem. This may happen where the edge switch is a class 5 switch serving a metropolitan area.

When a toll telephone call originates at a toll subscriber's telephone connected to a PSTN or a CPE connected to a CPE network, the PSTN or the CPE network presents the call to the edge switching system. As the toll subscriber dials the digits corresponding to a telephone number of a destination station (called party number), they are captured by special circuits located in the edge switch. It should be noted that though the traditional language "circuit" is used to describe the various components of the switching systems or of other elements of the telecommunication networks, the invention encompasses computer executable software code normally resident on a computer readable medium which, in combination with a computer or the like, performs the function of these "circuits" as well. Accordingly, this invention should be understood to contemplate a complete equivalence between an electronic circuit and a programmed general purpose computer comprising a microprocessor executing software code configured to perform the principles of the invention.

When the toll subscriber dials a toll number in prior art systems, the call is transferred by the edge switch to the toll tandem. This is done by opening a voice path between the edge switch and the toll tandem and transferring control of the call to the toll tandem. If the AIN is not provisioned to treat the call as a trigger condition, i.e., the phone call does not cause an AIN trigger condition, the call is completed by the toll tandem in the traditional way. If, on the other hand, a trigger condition is provisioned in the toll tandem switch for the call, the toll tandem switch queries the 2NCP™ database for special routing or billing instructions and receives any such instructions needed to complete the call. Based on these instructions, the toll tandem may determine that the call does not need any further input from the toll subscriber. In such cases, the call is routed in the traditional way. If, on the other hand, the instructions from the 2NCP™ database specify that additional input is required from the toll subscriber, the toll tandem enters into an interactive dialog with the toll subscriber, plays appropriate signals such as voice prompting messages, and receives the input from the toll subscriber.

It should be noted that when an additional input is required from the toll subscriber, the edge switch opens a voice path and transfers the control of the toll call to the toll tandem in order to reach the 2NCP™ database. This process of delivering a call to a toll tandem node in order to reach the 2NCP™ database is called chaining the query (or chaining the call) through the toll tandem. In trying to accommodate the chaining of calls to provide an access gateway to the 2NCP™ database, processing capacity of the gateway is consumed in processing calls that could have been routed without accessing the toll tandem in that way.

Using a toll tandem such as a 4ESS™ to make the routing decisions for calls that can be handled by the edge switches wastes the resources of the toll tandem, which can be put to better use in providing interactive dialog for calls requiring more sophisticated routing as described above. If a direct CCS connection were provided between the edge switches and the 2NCP™ database, only certain types of calls would be handled by the 4ESS™ toll tandem, thereby conserving its processing capacity for other purposes.

In cases where the edge switches are operated by entities different from the ones operating the concentrator node, there is an additional problem. Though SS7 is a "standard" way of accessing the SCP database, the particular implementation or configuration of the protocol may be different among the various edge switch vendors. In such a case, in order to communicate with a 4ESS™ toll tandem, a edge switch vendor must conform to the 4ESS™ implementation of the SS7 protocol. Thus, the operator of the edge switches will have only a limited number of vendors from whom to select the edge switches that can communicate with the 4ESS™ toll tandem. If there exists a direct connection between a edge switch and the SCP, a multi-vendor network can be built.

Currently, the protocols used to interface with the 2NCP™ database are defined as non-standard or proprietary methods. This situation could be improved by allowing an open network interface to a hitherto proprietary network interface to connect to the 2NCP™ database. This serves the purpose of allowing devices from several different vendors to communicate with the 2NCP™ database using their own proprietary methods. Additionally, this preserves the existing customer logic intact.

There is a need, therefore, for a method and system to enable direct access to the 2NCP™ database for an edge switch to determine if a call requires additional information from the subscriber, without the 4ESS™ toll tandem acting as a gateway to the SCP. There is also a need for improvement over the prior art to provide a network interface as a way to allow access to the 2NCP™ database while maintaining transparency to the customers such as the nodal operators.

SUMMARY OF THE INVENTION

The above-identified problems are solved and a technical advance is achieved in the art by providing a method and system for an edge switch to access a Service Control Point (SCP) to make a preliminary determination of the call. In one aspect, the present invention is a system wherein a first switch having a class 5 design is connected via a first common channel signaling link to an SCP either directly or via a Segmentation Directory. The first switch is also connected to a second switch, preferably a class 4 office, via a voice path and optionally via a second common channel signaling link. The second switch is in turn connected to the SCP either directly or via a third common channel signaling link. The first switch is assumed to be AIN-equipped. When the first switch receives a call from a calling party, it formulates and transmits a query message to the SCP and receives a response message. Based on the information contained in the response message, the first switch completes the call or delivers the call to the second switch in order to query the database again and determine what additional information should be collected from the calling party.

In another aspect, the invention is a method for obtaining capacity relief by reducing call volume (load) at the second switch whereby the first switch receives call discrimination information by querying an SCP and routes the call via alternate paths if the call does not require the establishment of a voice path between the first switch and the second switch.

By configuring components of a telecommunications network in a manner exemplified by a preferred embodiment described below, the present invention (i) provides a method of obtaining capacity relief for certain other components of the network; (ii) provides a method of customizing an existing nodal database capable of providing proprietary services to provide similar or same services over a different interface, preferably an industry standard interface, thereby providing interface transparency to existing customers while facilitating the reuse of network components for new customers; (iii) provides an industry standard way to connect to an IXC vendor's nodal services, enabling such services to be expanded to a multi-vendor switching base; (iv) provides a network framework that allows service or customer specific information presently derived from nodal trunks or switches to be defined and controlled in SCP databases, and permits future extensions to switched access traffic on edge vehicles; and (v) creates an infrastructure that permits an early determination to be made regarding the appropriate sub-network that is best able to process a call, based on a need for a specific type and number of resource(s).

DETAILED DESCRIPTION OF THE PREFERRED EMBODIMENTS

Figure 1:
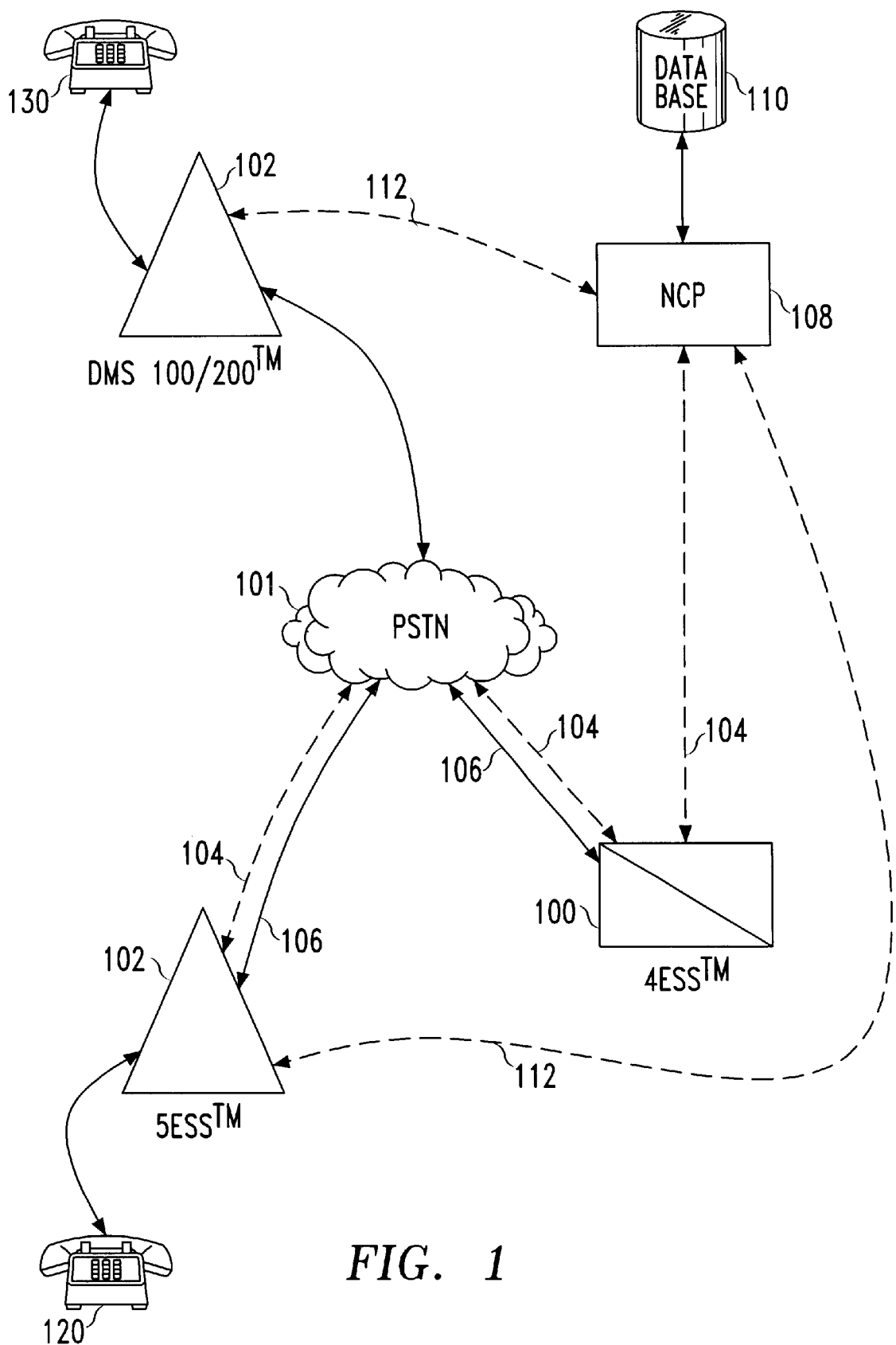
FIG. 1 is a block diagram of a telecommunications network in which the principles of the present invention may be practiced.

Now referring to FIG. 1, the PSTN 101 has one or more edge switches 102, 102' which are coupled to a gateway switch 100 through either direct or tandem exchanges or connections 101a established via a CCS data link 104 (shown in dotted lines) and a voice path 106 (shown in solid lines). The edge switches 102 (102') and the gateway switch 100 are also connected via CCS data links 112 (112') and 105, respectively, to a Service Control Point (SCP) 108.

Each edge switch 102 or 102' is a nodal switch which could be a central office switching system of a class 5 design and equipped with intelligent network facilities, and is preferably a Lucent® 5ESS™ electronic switching system. In an alternative embodiment, the edge switch could be a Nortel® DMS-250™ digital multiplex switching system. The gateway switch 100 is a toll tandem switch of class 4 design with intelligent network facilities, and is preferably an Lucent® 4ESS™ toll tandem. The CCS data links 104 and 105 are preferably SS7 links. SCP 108 is a network element which includes a processor coupled to a database. In a preferred embodiment, the SCP 108 hosts a Lucent® 2NCP™ database, which stores the information needed to route certain types of telephone calls. As seen in FIG. 1, the SCP 108 is connected to the gateway switch 100 and is programmed to respond to queries via the CCS data link 105.

The SCP 108 is also connected via CCS data links 112 and 112' to the edge switches 102 and 102' respectively. Thus, the edge switch is connected to both the toll tandem switch 100 and the SCP 108 via different SS7 links.

Connected to the edge switches 102 and 102' are subscriber telephones 120 and 130 respectively. It should be noted that the subscriber telephones 120, 130 could be any customer premise equipment such as a Private Branch Exchange (PBX), fax machine or other equipment such as nodal equipment.

In a preferred configuration, the edge switch 102 is linked to a directory server 140, either directly or through a signaling or data network such as AT&T's SS7 network. The directory server 140, typically referred to as a Segmentation Directory (SD), contains information regarding the manner in which the call should be processed further. In particular, the SD 140 includes directory information regarding which one of several service directories such as the SCP 108 should be accessed for specific call processing information. The SD 140 is connected to the edge switches 102 and 102' via SS7 links 146 and 146' respectively. Additionally, the SD 140 is connected to the SCP 108 via SS7 link 150, and other SCPs via other links (not shown). Thus, for example, if the incoming call is an 800-number call, the edge switch 102 first sends a query message in an SS7 format to the SD 140 via the link 146. In response, the SD 140 performs a database lookup and determines that a particular processor, say processor SCP 108, is associated with 800-number calls and should be accessed for service information concerning how such calls should be processed. If the call is a 900-number call, the SD 140 based on a lookup of its directory information determines and forwards the call to another SCP, say SCP' (not shown in FIG. 1). Once SD 140 makes this determination, it routes the query from the switch accordingly to the identified SCP, say SCP 108.

As shown in FIG. 1, the other edge switches in the network, such as edge switch 102', likewise have the capability of accessing the SD 140 (or a copy thereof), as well as the required one of the directories SCP 108 and SCP' (not shown), (or copies thereof), upon receipt of an incoming call. Thus, the SD 140 and service directories SCP 108 and SCP' (not shown) are common to the edge switches 102 and 102' in the network 101 or, alternatively, each edge switch 102 and 102' may have access to a separate copy of the SD 140 and separate copies of the service directories SCP 108 and SCP' (not shown).

The communication interfaces between the several elements of the network, the SCP 108, the SD 140, and the edge switches 102 and 102' in the network 101 are either proprietary or "open." In cases where some or all of these elements are reached only via a proprietary communication interface, there is a disadvantage. Network elements manufactured by vendors who do not have access to the proprietary communication interface will not function according to the expectations of a customer. If the communication interfaces are built, as is the case in a preferred embodiment, using an industry standard "open" interface specification, such as the "Bellcore standard AIN protocol" published by Bell Communications Research (Bellcore) ("the Bellcore standard protocol"), then a provider of services operating the network elements such as the SD 140, the SCP 108 and the edge switches 102 and 102' attracts customers with a multi-vendor switching base. In other embodiments, other "standard" protocols are used. Accordingly, the invention in a preferred mode contemplates an open interface to communicate with the several network elements.

In such a case, there is a situation that requires two different types of interfaces for two classes of customers: existing customers and new customers. If existing customer networks interface with the network elements SD 140, and the SCP 108 using a proprietary interface, it is preferable that they are not required to change the existing interfaces to a new "open" interface to continue to be serviced by the network elements. Thus, a preferred architecture uses a device to allow communication using both an open interface and a proprietary interface. This provides a transparent way to access the network elements for the existing customers. Additionally, this architecture facilitates the reuse of network elements for new customers using an open interface, thereby enhancing the return on investment made in the network elements.

When a "standard" protocol such as the Bellcore standard protocol is used, the message fields that are provided in the standard protocol may still need to convey proprietary information between the network elements. This is sometimes important for reasons of backward compatibility and uniformity with existing customer interfaces. In such a case, the standard protocol message fields are used to convey such proprietary information between the network elements.

Figure 2:
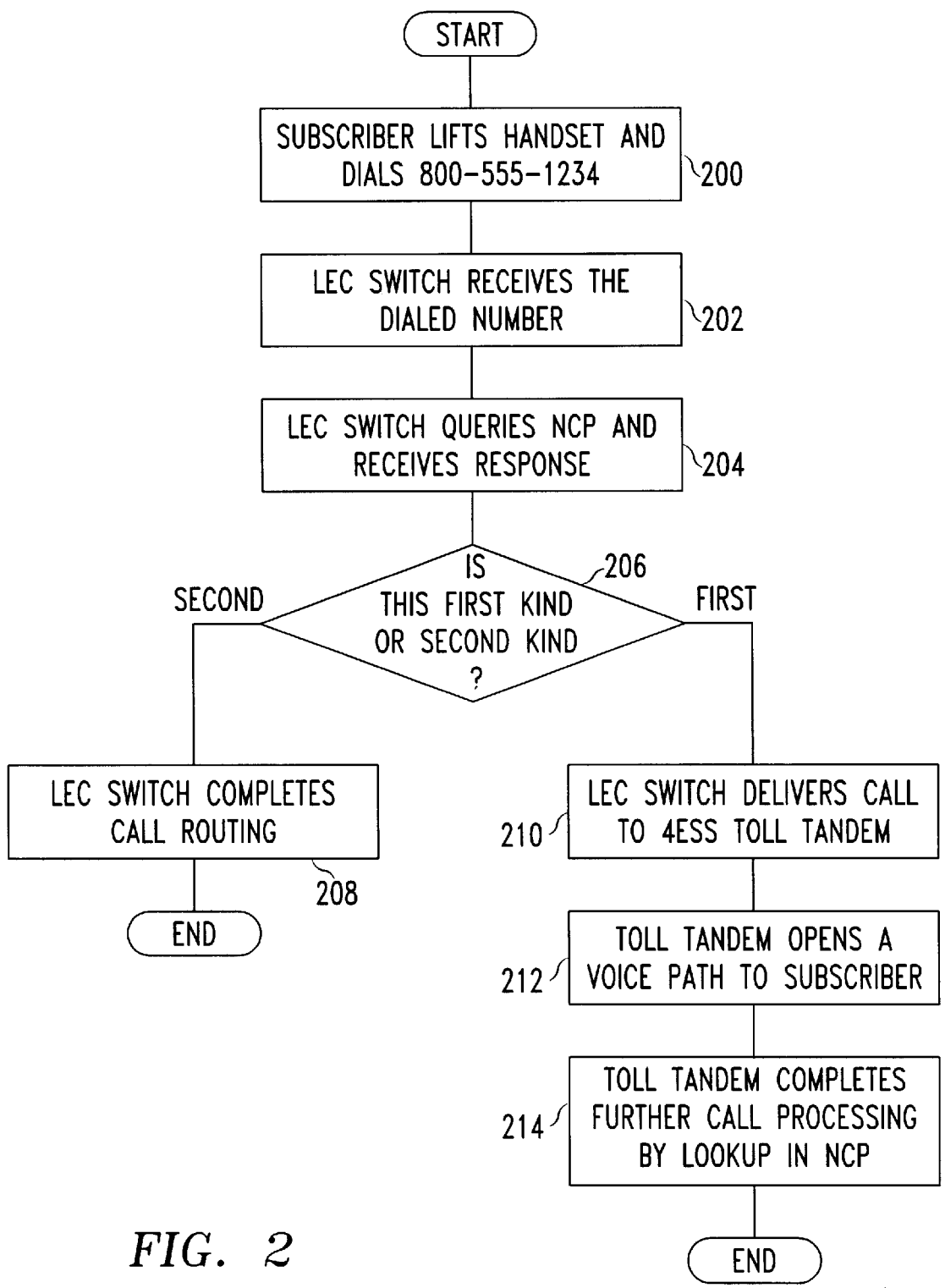
FIG. 2 is a flow chart of a query performed directly by an edge switch without accessing the toll switch.

Now referring to FIG. 2, a calling party at telephone 120 goes off-hook to make a telephone call to a called party at telephone 130. The off-hook signal is detected by the edge switch 102, which presents a dial tone signal to the calling party telephone 120. The calling party at telephone 120 dials the telephone number for the called party at telephone 130 (step 200). These digits (called dialed number, or DN) are collected by the edge switch 102 (step 202).

Assume that the edge switch 102 is provisioned to act upon the DN, i.e., a trigger condition is defined within the edge switch 102 for the DN. In a preferred embodiment, the edge switch 102 sends a message to the SD 140. If the SD 140 is connected to several SCP databases and can route the call in any one of a plurality of ways, it determines which SCP has the service logic to process the call. Accordingly, the SD 140 routes the message from the edge switch 102 to the appropriate SCP, for example to SCP 108, if it determines that the SCP 108 contains pertinent information to further process the call (step 204).

In an alternative embodiment, the edge switch 102 directly queries the SCP 108 to determine if the call is a local or a toll call. Thus, in an alternative embodiment, step 204 is not included. As is understood by a person skilled in the art, there could be other variations that can be made of telephone call processing methods which apply to the present invention. Likewise, there could be other distinctions than a simple local/toll discrimination that can be performed using the principles of the present invention.

Illustratively, and not by way of limitation, the edge switch 102 formulates a TCAP query message via the SS7 link 112 to the SCP 108. The SCP 108 receives the TCAP query message, deciphers the message to determine the nature of the query message and provides information for routing the call accordingly. For example, the TCAP query message may contain the telephone number of the calling party at telephone 120 and the DN. Depending on either of the two numbers, or the combination of the two numbers there could be entries made in the SCP 108 indicating that the DN should be translated to a different number and the call be routed to the translated number. This is typically the case for a Green-Number Service (GNS), also known as 800-number service, where a telephone number of the form 800-555-1234 is translated to a conventional POTS number. After retrieving the translated number, the SCP 108 transmits the number in a TCAP response message. (Step 204). In communicating with the SCP 108, the edge switch 102 uses a standard communication protocol such as the publicly known Bellcore standard protocol for TCAP. But the messages are configured in such a way to convey the information that a proprietary SCP 108 is configured to receive. Thus, though the protocol used is a Bellcore standard protocol, all the information that a proprietary SCP is configured to receive is still sent to the SCP 108. For example, the response message sent by the SCP 108 uses a "Primary Carrier ID" parameter field within the response message data structure to indicate to an edge vehicle which routing translators should be invoked. Other alternatives are also possible depending on the instructions to be given to an edge vehicle: an instruction to the edge switching vehicle to "up-chain" the call to another switch can be done by using the "Charge Party Station Type" parameter; and if there is a need to send billing records created at the SCP 108 to the edge switching vehicles, an instruction to perform this task could be done by using the "Furnish AMA" parameter. In an alternative embodiment, the SCP 108 may simply receive a calling party number that is a part of an SDN, and translate a 7-digit number to a POTS number.

The edge switch 102, upon receiving the response message from the SCP 108, determines if the telephone call is of the first kind (i.e., one requiring additional information from a toll subscriber) or of the second kind (i.e., one requiring no additional information from a toll subscriber, such as an 800-number) based on the information received or retrieved from the SCP (Step 206). If the call is determined to be of the second kind, it is completed by the edge switch 102 thereafter in a traditional way (step 208). One skilled in the art easily understands the different methods of call completion by the edge switch 102.

If, on the other hand, the edge switch 102 determines that the call is of the first kind, then the call is transferred to the toll tandem 100 by sending a signal (step 210). The toll tandem 100 signals back to the edge switch 102 indicating that it received the call and opens a voice communication path 106 with the calling party 120 to receive additional information from the subscriber (step 212). If the toll tandem is provisioned with AIN trigger conditions, the toll tandem suspends the call and enters into a dialog with the calling party 120. After receiving the additional information, the toll tandem completes the call in a traditional manner (step 214).

This request-response sequence provides a way for the network infrastructure to make an early determination of the appropriate sub-network to be used to perform routing of the telephone call by selecting an appropriate resource based on the particular characteristics of the telephone call. Thus, a preferred embodiment of the present invention achieves one of its objectives of providing capacity relief for certain elements of the switching fabric, while creating an industry standard interface in order to provide service to networks serviced by equipment made by many different vendors.

The foregoing describes a new and useful system and method for bypassing a toll tandem when an edge switching system routes certain kinds of telephone calls. The many features and advantages of the present invention are apparent from the detailed specification, and thus it is intended by the appended claims to cover all such features and advantages of the invention which fall within the true spirit and scope of the present invention. Furthermore, since numerous modifications and variations will readily occur to those skilled in the art, it is not desired that the present invention be limited to the exact construction and operation illustrated and described herein. Accordingly, all suitable modifications and equivalents which may be resorted to are intended to fall within the scope of the claims. For example, the CCS data link described between the SCP and the edge switching system could be implemented by having a TCAP over Asynchronous Transfer Mode (ATM) link; the "call" could be a video conversation; the PSTN could also comprise a wireless communication network or a cable network; and how a call is discriminated may be defined in a multitude of ways.

What is claimed is:

1. A method for routing telephone calls in an Advanced Intelligent Network (AIN) to provide capacity relief to an existing telecommunications network element, the method comprising:

receiving at a first switch 102, a telephone call from a calling party;

transmitting a first query message from said first switch 102 to a service control point 108, said first query message being received by said service control point 108 without having been routed through a second switch 100;

receiving at said first switch 102, a first response message from the service control point 108;

routing the telephone call to a called party via the second switch 100 after requesting additional information from the calling party and receiving a response thereto, if the telephone call is determined to be of a first kind based on the first response message; and routing the telephone call to a called party via the first switch 102 and without accessing said second switch 100, if the telephone call is determined to be of a second kind based on the first response message.

2. The method of claim 1, wherein said first query message is first routed to a segmentation directory 140 via a link 146 and said segmentation directory determines an appropriate control point for further handling the telephone call, based on information in said first query message.

3. The method of claim 1, wherein the step of routing the telephone call to a called party via the first switch 102 comprises the step of determining whether the communication requires further input from the calling party.

4. The method of claim 3, wherein the determining step is made at an early stage in the telephone call based on the type and quantity of resources needed to further process the telephone call.

5. The method of claim 1, wherein the service control point 108 communicates with other elements of the network using an industry standard protocol.

6. The method of claim 5, wherein the industry standard protocol is a Bellcore standard AIN protocol.

7. The method of claim 5, wherein proprietary information is transmitted in standard protocol message fields.

8. The method of claim 7, wherein the standard protocol message field "Primary Carrier ID" contains information indicating which routing translators should be invoked.

9. The method of claim 7, wherein the standard protocol message field "Charge Party Station Type" contains information indicating an instruction to "up-chain" the telephone call to a particular switch.

10. The method of claim 7, wherein the standard protocol message field "Furnish AMA" contains billing information created at the service control point 108.

11. The method of claim 1, wherein the first switch 102 is of a class 5 design.

12. The method of claim 1, wherein the first switch 102 is a central office facility.

13. The method of claim 1, wherein the second switch 102 is of a class 4 design.

14. The method of claim 1, wherein the second switch 100 is a toll tandem switch.

15. A computer readable medium having stored thereon computer executable code for routing telephone calls in an Advanced Intelligent Network (AIN) to provide capacity relief to an existing telecommunications network element, said computer readable medium comprising:

code for receiving at a first switch 102, a telephone call from a calling party;

code transmitting a first query message from said first switch 102 to a service control point 108, said first query message being received by said service control point 108 without having been routed through a second switch 100;

code for receiving at said first switch 102, a first response message from the service control point 108;

code for routing the telephone call to a called party via the second switch 100 after requesting additional information from the calling party and receiving a response thereto, if the telephone call is determined to be of a first kind based on the first response message; and code routing the telephone call to a called party via the first switch 102 and without accessing said second switch 100, if the telephone call is determined to be of a second kind based on the first response message.

* * * * *